United States Patent [19]

Bronstein

[11] 4,253,785
[45] Mar. 3, 1981

[54] PICK-UP TRUCK EDGE PROTECTOR AND ANCHOR MEMBER

[76] Inventor: Benjamin Bronstein, Clearwater, Canada, V0E 1N0

[21] Appl. No.: 42,958

[22] Filed: May 29, 1979

[30] Foreign Application Priority Data

Jan. 17, 1979 [CA] Canada .................................. 319779

[51] Int. Cl.³ ............................................ B61D 45/00
[52] U.S. Cl. .................................. 410/110; 410/115; 296/392; 114/218
[58] Field of Search ....................... 410/10, 11, 41, 43, 410/90, 91, 166, 108, 110, 115, 107, 109; 296/100, 135, 136, 41, 35 R, 39 R; 114/218

[56] References Cited

U.S. PATENT DOCUMENTS

| | | | |
|---|---|---|---|
| 2,605,720 | 8/1952 | Smith | 410/110 |
| 3,334,914 | 8/1967 | Vierregger | 410/106 |
| 4,181,351 | 1/1980 | Spankle | 296/100 |

FOREIGN PATENT DOCUMENTS 596335  6/1959  Canada ..................................... 296/100

Primary Examiner—David M. Mitchell
Assistant Examiner—D. W. Underwood
Attorney, Agent, or Firm—Colton & Stone, Inc.

[57] ABSTRACT

An edge protector and anchor member for the upper edge portion of the side wall of a pick-up truck box is formed as a generally U-shaped channel member. One leg of the member extends into the interior of the box to protect the upper inside portion of the side wall. The other leg extends downwardly on the outside of the side wall and has a plurality of spaced apart anchor means along the marginal edge thereof. Each anchor means comprises a tab flanked by notches struck from the leg with the tab being bent inwardly of the channel member. A rope or other tie-down device may be connected to the tabs for securing a load in the box.

2 Claims, 3 Drawing Figures

U.S. Patent   Mar. 3, 1981   4,253,785
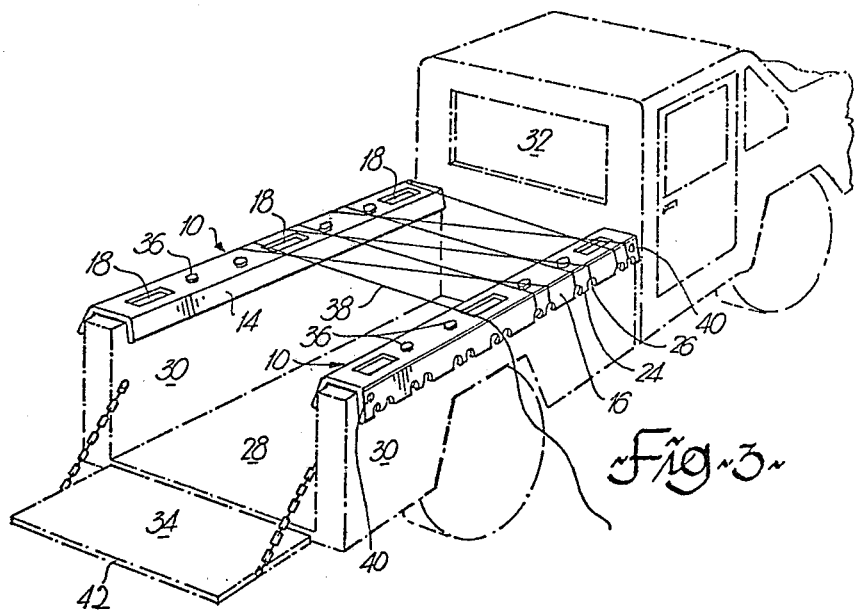
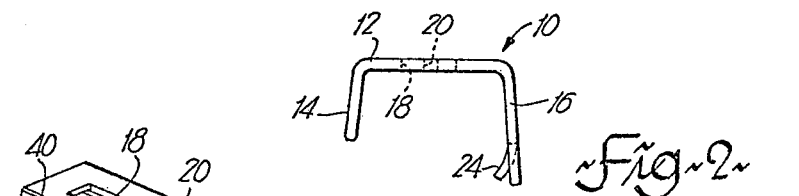
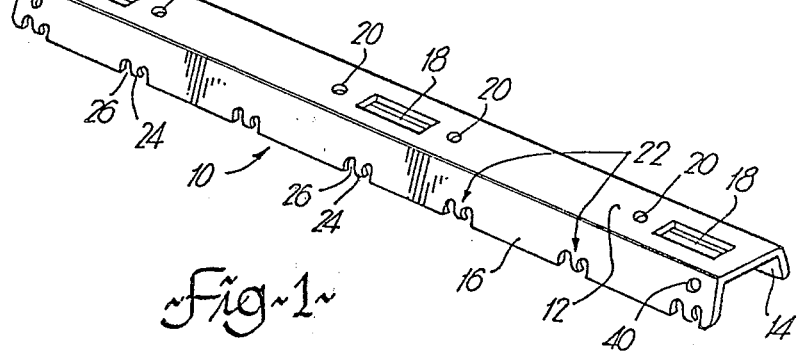

PICK-UP TRUCK EDGE PROTECTOR AND ANCHOR MEMBER

The present invention relates to an edge protector and anchor member for a pick-up truck box.

BACKGROUND OF THE INVENTION

The pick-up style of truck has been growing in popularity considerably over the past several years, both in commercial usage and as primary transportation for many families. When used as personal transportation most owners endeavour to keep the vehicle in good condition and when loads are carried they desire to protect the vehicle as much as possible. Since the load-carrying box is subject to damage from the load it becomes desirable to protect the box, and particularly the upper edges thereof, whenever possible. Also, it is very desirable to be able to tie down a load in the box so as to keep it from shifting and thereby damaging the box.

DESCRIPTION OF THE PRIOR ART

Most domestic pick-up trucks have openings in the upper edge portion of the box sides, known as stake pockets, to receive stakes therein, which stakes can be used to anchor ropes or other load-holding devices. See for example my Canadian Pat. No. 895,093 issued Mar. 14, 1972 for a "Pick-Up Load Holder". Such stakes are not the best for connecting a rope thereto as they are not positioned at sufficient points to be useful for loads of differnet sizes. They are also not particularly useful if the load must rest on the edge of the box, for example if a camper body is carried by the vehicle.

Some imported pick-up trucks have anchor hooks permanently welded to the outside wall of the box thereby overcoming the problems of using the stakes as anchors. However, there is no protection for the upper edge portion of the box in the event that a load must be carried on or against those edge portions.

U.S. Pat. No. 3,722,910 issued Mar. 27, 1973 to Harry R. Heckenlaible, shows a channel member affixed to the outer wall of the pick-up box and a plurality of hooks which may be adjustably positioned lengthwise of the member and locked in a desired position. This device makes it possible to tie the load in place no matter what size of load is carried, but it is cumbersome to use and still offers no protection to the upper edge of the box.

SUMMARY OF THE INVENTION

The present invention overcomes the problems of the prior art by providing an edge protector which mounts over the upper edge portion of a pick-up box side to protect it from damage caused by loads which might contact the upper edge. In addition it provides anchor means on the outside of the protector to which ropes or other tie-down means may be attached. A portion of the protector extends into the box to protect the upper inside edge thereof. Also, by providing appropriate openings in the protector it is possible to still utilize the stake pockets for their intended purpose.

Broadly speaking, therefore, the present invention provides an edge protector and anchor member for an upper edge portion of a pick-up truck box side wall comprising a longitudinally extended channel member of generally U-shape in cross-section having a base and a pair of legs extending therefrom, the base being adapted to sit on the edge portion with one leg extending downwardly into the box and the other leg extending downwardly exteriorly of the box, the base portion having openings therein each alignable with a stake pocket in the edge portion and being provided with means to affix the member to the edge portion, the other leg being provided with a plurality of longitudinally spaced apart anchor means for receiving tie-down means for securing a load in the box.

BRIEF DESCRIPTION OF THE DRAWINGS

FIG. 1 shows the edge protector of the present invention in perpsective.

FIG. 2 shows an end view of the edge protector.

FIG. 3 shows a pick-up truck with edge protectors of the present invention in place and in use.

DESCRIPTION OF THE PREFERRED EMBODIMENT

FIG. 1 illustrates the edge protection and anchor member 10 in perspective. It is seen as a generally U-shaped channel having a base 12 and a pair of legs 14, 16 extending therefrom. The width of base 12 is such as to cover the upper edge portion of the pick-up box side wall and the base is provided with a pluraity of generally rectangular openings 18 which are alignable with the stake pockets in the box when the member is assembled to the vehicle. A plurality of holes 20 is provided for use in bolting the member to the upper edge portion of the box side wall, which holes may be countersunk if desired.

Leg 14 is intended to be positioned in the interior of the box adjacent the upper inside edge of the box wall and leg 16 is intended to be positioned exteriorly of the box. To facilitate assembly to the box the legs 14 and 16 may be slightly splayed and of different lengths as shown in FIG. 2.

Along the lower marginal edge of leg 16 I provide a plurality of anchor means 22. While a particular form of anchor means is illustrated it is understood that other types could be utilized without departing from the spirit of my invention.

As shown in FIGS. 1 and 2 the preferred form of anchor means includes a peg or tab 24 flanked by rounded notches or cut-outs 26. As shown best in FIG. 2, each tab is bent inwardly of the channel to provide a hook-like anchor for a rope or other tie-down member.

FIG. 3 shows a pick-up box 28 defined by side walls 30, cab 32 and tailgate 34. An edge protector and anchor member 10 is shown as being mounted to each upper edge portion of the box side walls as by bolts 36 with the openings 18 aligned with the box stake pockets. While a load per se is not shown, a rope 38 is illustrated as traversing the box and as being looped around the tabs 24 through the notches 26. The rope could be attached in any desired configuration so as to positively secure a load in the box to prevent movement thereof. Also, with the legs 14 extending into the box the upper inside edges of the box side walls are protected from damage by the load.

The edge protector and anchor member is preferably formed from ⅜ inch sheet steel plate although any suitable material could be used. For example many of the highly durable plastics now available could be moulded to form the member.

While not specifically illustrated in the drawings the anchor aspect of the present invention could be used to secure a load which is adjacent to or resting on the base of the member 10. For example if the pick-up truck is used to carry a camper body, that body could be securely held in the box by being tied to the box via ropes and the tabs 24, or via a turn-buckle anchord to through-hole 40.

Finally it should be noted that a member similar to member 10 could be attached to the upper edge portion 42 of the tailgate 34, primarily to protect that portion of the vehicle, although the anchor means 22 could be effectively utilized to secure cargo within the box.

The preceeding description is intended to present the best mode of putting the invention into effect. However departures from the described invention are likely possible for persons skilled in the art, but without departing from the spirits of my invention. Accordingly the protection to be afforded my invention should be determined from the appended claims.

The embodiments of the invention in which an exclusive property or privilege is claimed are defined as follows:

1. An edge protector and anchor member for an upper edge portion of a pick-up truck box side wall comprising a longitudinally extended channel member of generally U-shape in cross-section having a base and a pair of legs extending therefrom said base being adapted to set on said edge portion with one leg extending downwardly into said box and the other leg extending downwardly exteriorly of said box, said base portion having openings therein each alignable with a stake pocket in said edge portion and being provided with means to affix the member to the edge portion, said other leg being provided with a plurality of longitudinally spaced apart anchor means for receiving tie-down means for securing a load in said box, each of said anchor means includes a tab flanked by notched portions of a marginal edge of said other leg, said tab being formed from the material of said other leg and being bent inwardly of said member.

2. The edge protector and anchor member of claim 1 wherein said legs are slightly splayed, said one leg being shorter than said other leg.

* * * * *